US010125303B2

(12) United States Patent
Wilson et al.

(10) Patent No.: US 10,125,303 B2
(45) Date of Patent: Nov. 13, 2018

(54) COMPOSITIONS AND METHODS FOR CEMENTING A WELLBORE USING MICROBES OR ENZYMES

(71) Applicants: Michael B. Wilson, Tomball, TX (US); Mark A. Vorderbruggen, Spring, TX (US); Charles David Armstrong, Tomball, TX (US)

(72) Inventors: Michael B. Wilson, Tomball, TX (US); Mark A. Vorderbruggen, Spring, TX (US); Charles David Armstrong, Tomball, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 512 days.

(21) Appl. No.: 14/814,925

(22) Filed: Jul. 31, 2015

(65) Prior Publication Data
US 2017/0029689 A1 Feb. 2, 2017

(51) Int. Cl.
*C09K 8/467* (2006.01)
*C04B 28/02* (2006.01)
*C09K 8/487* (2006.01)
*C04B 103/00* (2006.01)

(52) U.S. Cl.
CPC .............. *C09K 8/467* (2013.01); *C04B 28/02* (2013.01); *C04B 2103/0067* (2013.01); *C09K 8/487* (2013.01); *Y02W 30/94* (2015.05); *Y02W 30/95* (2015.05)

(58) Field of Classification Search
CPC . C09K 8/46; C09K 8/467; C09K 8/48; C09K 8/487; C04B 280/02; C04B 2103/0067; C04B 28/02
See application file for complete search history.

(56) References Cited

U.S. PATENT DOCUMENTS

| 6,110,875 A * | 8/2000 | Tjon-Joe-Pin | C04B 24/38 166/246 |
| 7,036,586 B2 | 5/2006 | Roddy et al. | |
| 8,592,353 B2 | 11/2013 | Dalrymple et al. | |
| 9,061,940 B2 * | 6/2015 | Chen | C04B 12/00 |
| 9,199,880 B2 * | 12/2015 | Dosier | C04B 24/12 |
| 9,428,418 B2 * | 8/2016 | Dosier | C04B 24/12 |
| 9,796,626 B2 * | 10/2017 | Dosier | C04B 24/14 |

(Continued)

FOREIGN PATENT DOCUMENTS

WO 2015091712 A1 6/2015

OTHER PUBLICATIONS

Trimble, Peter "Stools made of sand and urine" dezeen, http://www.dezeen.com/2014/02/08/stools-made-of-sand-and-urine-by-peter-trimble/, Feb. 8, 2014, pp. 1-33.

(Continued)

*Primary Examiner* — Zakiya W Bates
*Assistant Examiner* — Crystal J Miller
(74) *Attorney, Agent, or Firm* — Cantor Colburn LLP

(57) ABSTRACT

A method of cementing a wellbore penetrating a subterranean formation comprises injecting into the wellbore a settable slurry comprising: an aqueous carrier; an aggregate; urea; a calcium source; and a calcium carbonate producing agent comprising a microbe, an enzyme, or a combination comprising at least one of the foregoing; and allowing the slurry to set.

23 Claims, 2 Drawing Sheets

(56) References Cited

U.S. PATENT DOCUMENTS

| | | | | |
|---|---|---|---|---|
| 2012/0031303 | A1* | 2/2012 | Constantz | C04B 14/26 |
| | | | | 106/640 |
| 2013/0085210 | A1* | 4/2013 | Friedel | C04B 24/42 |
| | | | | 524/5 |
| 2013/0167756 | A1* | 7/2013 | Chen | C04B 12/00 |
| | | | | 106/706 |
| 2014/0239535 | A1* | 8/2014 | Dosier | C04B 24/12 |
| | | | | 264/128 |
| 2015/0122486 | A1* | 5/2015 | Luke | C09K 8/467 |
| | | | | 166/246 |
| 2016/0068438 | A1* | 3/2016 | Dosier | C04B 24/12 |
| | | | | 264/112 |
| 2016/0362334 | A1* | 12/2016 | Dosier | C04B 24/12 |

OTHER PUBLICATIONS

Abo-El-Enein, et al.; "Utilization of Microbial Induced Calcite Precipitation for Sand Consolidation and Mortar Crack Remediation"; HBRC Journal; 2012, vol. 8, No. 3; Elsevier; 8 pages.

Chidara, R. et al; "Achievement of Early Compressive Strength in Concrete using Sporosarcina Pasteurii Bacteria as an Admixture"; Advances in Civil Engineering; 2014, vol. 2014; Article ID 435948; Hindawi Publishing Corporation; 7 pages.

Cunningham, et al.; "Wellbore leakage mitigation using engineered biomineralization"; Energy Procedia; 2014; vol. 63; 8 pages.

International Search Report and Written Opinion; International Application No. PCT/US2016/044069; International Filing Date: Jul. 26, 2016; dated Oct. 20, 2016; 11 pages.

Kim, et al; "Effects of Ground Conditions on Microbial Cementation in Soils"; Materials; 2014, vol. 7, No. 1; MDPI, Basel, Switzerland; 14 pages.

\* cited by examiner

COMPOSITIONS AND METHODS FOR CEMENTING A WELLBORE USING MICROBES OR ENZYMES

BACKGROUND

In the oil and gas industry, cementing is a technique employed during many phases of borehole operations. For example, a cement slurry may be employed to cement or secure various casing strings and/or liners in a well. In other cases, cementing may be used in remedial operations to repair casing and/or to achieve formation isolation. In still other cases, cementing may be employed to isolate selected zones in the borehole and to temporarily or permanently abandon a borehole.

Because of the extensive use of cement in the oil and gas industry, the art would be receptive to alternative materials and methods for cementing wellbores. It would be an advantage if the alternative materials and methods are environmentally friendly while still producing comparable performance as conventional cement.

BRIEF DESCRIPTION

A method of cementing a wellbore penetrating a subterranean formation comprises injecting into the wellbore a settable slurry comprising: an aqueous carrier; an aggregate; urea; a calcium ion source; and a calcium carbonate producing agent comprising a microbe, an enzyme, or a combination comprising at least one of the foregoing; and allowing the slurry to set.

A settable slurry for cementing a wellbore penetrating a subterranean formation comprises: an aqueous carrier; an aggregate which comprises sand, gravel, crushed stone, slag, recycled concrete, silica, grass spheres, limestone, feldspar, or a combination comprising at least one of the foregoing aggregate; urea; a calcium ion source; and a calcium carbonate producing agent comprising a microbe, an enzyme, or a combination comprising at least one of the foregoing; wherein the settable slurry comprises solids in an amount of about 50 wt. % to about 95 wt. % based on the total weight of the slurry.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
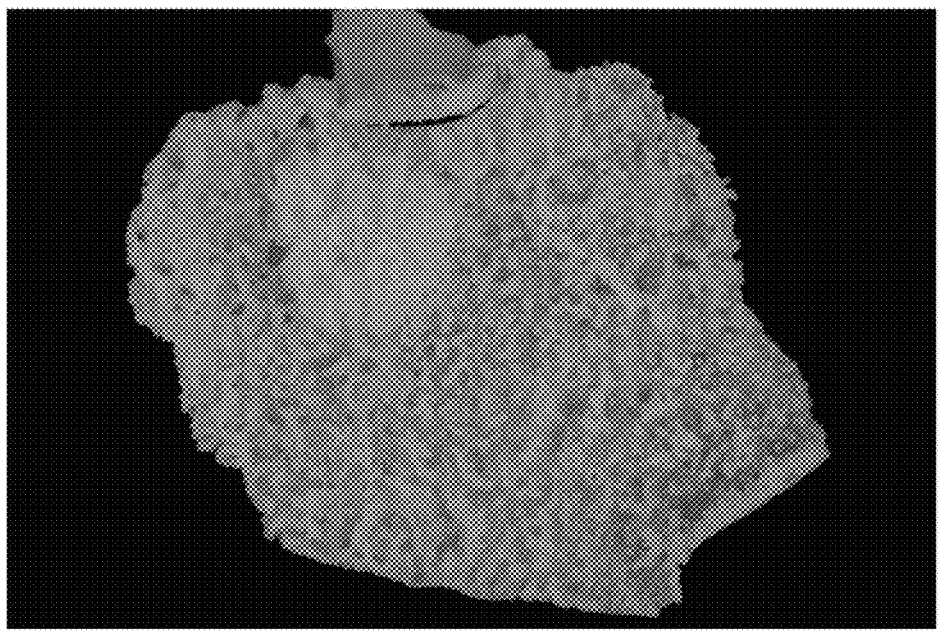
FIG. 1 is an optical microscope image of Example C2 showing sand grains cemented together using a urease solution.

It has been found that settable slurries described herein can be used to replace conventional cement for various downhole applications. The settable slurries contain an aqueous carrier; an aggregate such as sand grains; urea; a calcium ion source; and a calcium carbonate producing microbe or enzyme or a combination thereof. Advantageously, the slurries remain pumpable at wellbore conditions until setting, at which time they harden and form a set material having the strength comparable to conventional mortars and concretes. Without wishing to be bound by theory, it is believed that during setting, the microbe or enzyme hydrolyzes urea producing ammonia and carbon dioxide thus increasing the pH of the slurry. The rise in pH facilitates the formation of a calcium carbonate precipitate from calcium ions and carbon dioxide. The precipitated calcium carbonate fills the gaps among sand grains thus cementing or bonding the sand grains together.

Compared to conventional cement, the settable slurries can have lower material cost as sand is less expensive than cement. The settable slurries can also have lower transportation costs. Oilfield-quality cement is only manufactured in a few cement plants worldwide but sand is readily available at many places.

The use of settable slurries can also reduce fleet inventory and training as the equipment used for fracturing could also be used for pumping the settable slurries disclosed herein. In addition, the settable slurries could be more tolerant to human errors.

Microbes that have the ability to induce the precipitation of calcium carbonate include those from the genera such as *Bacillus* sp., *Sporosarcina* sp., *Spoloactobacilus* sp., *Clostridium* sp., *Desulfotomaculum* sp. or a combination thereof. Exemplary and non-limiting microbes include *Sporosarcina pasteurii* (formerly known as *Bacillus pasteurii*), *Bacillus megaterium*, *Sporosarcina ureae*, *Pseudomonas aeruginosa*, *Proteus Vulgaris*, *Bacillus sphaericus*, *Myxococcus xanthus*, *Leuconostoc mesenteroides*, *Bacillus subtilis*, *Deleya halophila*, *Halomonas eurihalina*, *Proteus mirabilis* and *Helicobacter pylori*. Non-pathogenic strains are preferred. *Sporosarcina pasteurii* is specifically mentioned. A combination of different microbes may be used. As used herein, the microbe includes bacteria and bacteria spores.

A calcium carbonate precipitating microbe is normally grown as a broth solution. In an embodiment, the microbe is provided with nutrients necessary to ensure its survival and multiplication. The nutrients are known to those skilled in the art. They provide the microbes with a source of carbon, nitrogen, and/or other elements essential for their physiological function. If several types of microbes are used, it may be necessary to use different nutrients, corresponding to the needs of each type of microbes. Exemplary nutrients include yeast extract, peptone from soy, industry byproducts such as lactose mother liquor, and corn steep liquor.

Suitable calcium carbonate precipitating enzyme includes urease (EC 3.5.1.5), amidase (EC 3.5.1.4), carbonic anhydrase (EC 4.2.1.1), glutamade dehydrogenase such as NAD (P) type (EC 1.4.1.3), glutamate synthase such as NADPH type (EC 1.4.1.13) and FAD type (EC 1.4.7.1). Urease is specifically mentioned. Urease is commercially available. It can be extracted from Jack beans (*Canavalia ensiformis*), watermelon seeds, pea seeds, and the like. Optionally, the settable slurries also comprise an enzyme stabilizer. Exemplary stabilizers include but are not limited to casein, albumin, powdered milk, whey protein, or bovine serum albumin, or a combination comprising at least one of the foregoing. The presence of enzyme stabilizers can enhance the activity of the enzymes. In an embodiment an enzyme stabilizer increases the $CaCO_3$ precipitation compared to the same slurry without the stabilizer, specifically, the amount of precipitated $CaCO_3$ formed from a settable slurry containing an enzyme stabilizer is about two times greater, five times greater, or ten times greater than the amount of precipitated $CaCO_3$ formed from the same slurry without the stabilizer.

Depending on the requirements of a particular application, the microbes or enzymes are present in an amount such that the settable slurry reaches at least about 60-90% of its final strength within about 1-10 hours or 2-8 hours after pumped downhole.

The urea may be provided in various forms. In an embodiment, the urea is provided as an aqueous solution in water. The effective amount of urea will depend on the amount of the other components and will be enough to ensure the formation of the material of desired strength at a desired rate. In an embodiment, the effective amount of urea in the settable slurries is about 5 mM to about 2 M or about 100 mM to about 1.5 M or about 800 mM to about 1.2 M.

The calcium ion sources include calcium chloride, calcium bromide, calcium nitrate, or a combination comprising at least one of the foregoing. In an embodiment, the calcium ion source is present in an amount effective to provide about 2 mM to about 2.5 M, about 10 mM to about 2 M, or about 250 mM to about 1.8 M calcium ions in the settable slurry. In the event that the liquid carrier fluid contains sufficient amount of calcium ion source, no additional calcium ion source needs to be separately added.

The settable slurry further comprises an aqueous carrier fluid. The aqueous carrier fluid is present in the settable slurry in an amount of about 10% to about 60% by weight, more specifically in an amount of about 20% to about 40% by weight, based on the total weight of the settable slurry. The aqueous carrier fluid can be fresh water, brine (including seawater), an aqueous base, or a combination comprising at least one of the foregoing. It will be appreciated that other polar liquids such as alcohols and glycols, alone or together with water, can be used in the carrier fluid.

The brine can be, for example, seawater, produced water, completion brine, or a combination comprising at least one of the foregoing. The properties of the brine can depend on the identity and components of the brine. Seawater, for example, can contain numerous constituents including sulfate, bromine, and trace metals, beyond typical halide-containing salts. Produced water can be water extracted from a production reservoir (e.g., hydrocarbon reservoir) or produced from an underground reservoir source of fresh water or brackish water. Produced water can also be referred to as reservoir brine and contain components including barium, strontium, and heavy metals. In addition to naturally occurring brines (e.g., seawater and produced water), completion brine can be synthesized from fresh water by addition of various salts for example, KCl, NaCl, $ZnCl_2$, $MgCl_2$, or $CaCl_2$ to increase the density of the brine, such as 10.6 pounds per gallon of $CaCl_2$ brine. Completion brines typically provide a hydrostatic pressure optimized to counter the reservoir pressures downhole. The above brines can be modified to include one or more additional salts. The additional salts included in the brine can be NaCl, KCl, NaBr, $MgCl_2$, $CaCl_2$, $CaBr_2$, $ZnBr_2$, $NH_4Cl$, sodium formate, cesium formate, and combinations comprising at least one of the foregoing. The NaCl salt can be present in the brine in an amount of about 0.5 to about 25 weight percent (wt. %), specifically about 1 to about 15 wt. %, and more specifically about 3 to about 10 wt. %, based on the weight of the brine.

The term "aggregate" is used broadly to refer to a number of different types of both coarse and fine particulate material, including, but are not limited to, sand, gravel, slag, recycled concrete, silica, glass spheres, limestone, feldspar, and crushed stone such as chert, quartzite, and granite. The fine aggregates are materials that almost entirely pass through a Number 4 sieve (ASTM C 125 and ASTM C 33). The coarse aggregate are materials that are predominantly retained on a Number 4 sieve (ASTM C 125 and ASTM C 33). In an embodiment, the aggregate comprises sand such as sand grains. The sand grains can have a size from about 1 µm to about 2000 µm, specifically about 10 µm to about 1000 µm, and more specifically about 10 µm to about 500 µm. As used herein, the size of a sand grain refers the largest dimension of the grain. Aggregate can be present in an amount of about 10% to about 95% by weight of the settable slurry, 10% to about 85% by weight of the settable slurry 10% to about 70% by weight of the settable slurry, 20% to about 80% by weight of the settable slurry, 20% to about 70% by weight of the settable slurry, 20% to about 60% by weight of the settable slurry, about 20% to about 40% by weight of the slurry, 40% to about 90% by weight of the settable slurry, 50% to about 90% by weight of the settable slurry, 50% to about 80% by weight of the settable slurry, or 50% to about 70% by weight of the settable slurry.

The settable slurries can further comprise various additives. Exemplary additives include a reinforcing agent, a self-healing additive, a fluid loss control agent, a weighting agent to increase density, an extender to lower density, a foaming agent to reduce density, a dispersant to reduce viscosity, a thixotropic agent, a bridging agent or lost circulation material, a clay stabilizer, or a combination comprising at least one of the foregoing. These additive components are selected to avoid imparting unfavorable characteristics to the settable slurry, and to avoid damaging the wellbore or subterranean formation. Each additive can be present in amounts known generally to those of skill in the art.

Reinforcing agents include fibers such as metal fibers and carbon fibers, silica flour, and fumed silica. The reinforcing agents act to strengthen the set material formed from the settable slurries.

Self-healing additives include swellable elastomers, encapsulated cement particles, and a combination comprising at least one of the foregoing. Self-healing additives are known and have been described, for example, in U.S. Pat. Nos. 7,036,586 and 8,592,353.

Fluid loss control agents can be present, for example a latex, latex copolymers, nonionic, water-soluble synthetic polymers and copolymers, such as guar gums and their derivatives, poly(ethyleneimine), cellulose derivatives, and polystyrene sulfonate.

Weighting agents are high-specific gravity and finely divided solid materials used to increase density, for example silica flour, fly ash, calcium carbonate, barite, hematite, ilemite, siderite, and the like.

Extenders include low density aggregates as described above, clays such as hydrous aluminum silicates (e.g., bentonite (85% mineral clay smectite), pozzolan (finely ground pumice of fly ash), diatomaceous earth, silica, e.g., α quartz and condensed silica fumed silica, expanded Pearlite, gilsonite, powdered coal, and the like.

The aqueous carrier fluid of the settable slurry can be foamed with a liquid hydrocarbon or a gas or liquefied gas such as nitrogen, or air. The fluid can further be foamed by inclusion of a non-gaseous foaming agent. The non-gaseous foaming agent can be amphoteric, cationic, or anionic. Suitable amphoteric foaming agents include alkyl betaines, alkyl sultaines, and alkyl carboxylates. Suitable anionic foaming agents can include alkyl ether sulfates, ethoxylated ether sulfates, phosphate esters, alkyl ether phosphates, ethoxylated alcohol phosphate esters, alkyl sulfates, and alpha olefin sulfonates. Suitable cationic foaming agents can include alkyl quaternary ammonium salts, alkyl benzyl quaternary ammonium salts, and alkyl amido amine quaternary ammonium salts. A foam system is mainly used in low pressure or water sensitive formations. A mixture of foaming and foam stabilizing dispersants can be used. Generally, the mixture can be included in the settable slurries in an amount of about 1% to about 5% by volume of water in the settable slurries.

Examples of suitable dispersants include but are not limited to naphthalene sulfonate formaldehyde condensates, acetone formaldehyde sulfite condensates, and glucan delta lactone derivatives. Other dispersants can also be used depending on the application of interest.

Clay stabilizers prevent a clay from swelling downhole upon contact with the water or applied fracturing pressure and can be, for example, a quaternary amine, a brine (e.g., KCl brine), choline chloride, tetramethyl ammonium chloride, or the like. Clay stabilizers also include various salts such as NaCl, $CaCl_2$, and KCl.

The pH of the settable slurry is about 7 to about 10, about 7 to about 9 or about 7 to about 8. A buffering agent can be optionally included in the settable slurry. Exemplary buffering agents include 2-amino-2-hydroxmethyl-propane-1,3-diol (TRIS), phosphate, carbonate, histidine, BIS-TRIS propane, 3-(N-morpholino)propanesulfonic acid (MOPS), (4-(2-hydroxyethyl)-1-piperazineethanesulfonic acid (HEPES), 2-[[1,3-dihydroxy-2-(hydroxymethyl)propan-2-yl]amino]ethanesulfonic acid (TES), 4-(N-Morpholino)butanesulfonic acid (MOBS), 3-(N-morpholino)propanesulfonic acid (MOPS), 3-(N,N-Bis[2-hydroxyethyl]amino)-2-hydroxypropanesulfonic acid (DIPSO), N-Tris(hydroxymethyl)methyl]-3-amino-2-hydroxypropanesulfonic acid (TAPSO), triethanolamine (TEA), pyrophosphate, N-(2-Hydroxyethyl)piperazine-N'-(2-hydroxypropanesulfonic acid) (HEPPSO), piperazine-1,4-bis(2-hydroxypropanesulfonic acid) dehydrate (POPSO), tricine, glyccylglycine, bicine, N-[tris(hydroxymethyl)methyl]-3-aminopropanesulfonic acid (TAPS), taurine, ammonia, ethanolamine, glycineTRIS, piperazine-N,N'-bis(2-ethanesulfonic acid) (PIPES).

The solid content of the slurry is about 50 to about 95 wt. % based on the total slurry weight, preferably about 60 to about 90 wt. % based on the total slurry weight, more preferably about 65 to about 85 wt. %, based on the total slurry weight.

The density of the settable slurry can vary widely depending on downhole conditions. Such densities can include about 5 to about 12 pounds per gallon when foamed. When unfoamed the density of a settable slurry can vary with such densities between about 9 up to about 15 pounds per gallon, or about 10 to about 14 pounds per gallons, or about 11 up to about 13 pounds per gallon. Of course, the settable slurries can also be higher density, for example about 15 to about 22 pounds per gallon.

The various properties of the settable slurry composition can be varied and can be adjusted according to well control and compatibility parameters of the particular fluid with which it is associated for example a drilling fluid. The settable slurry can be used to form downhole components, including various casings, seals, plugs, packings, liners, and the like. In an embodiment the component is a plug, including a temporary plug, permanent plug, or a whipstock plug. The whipstock plug can be used to kick off from a vertical wellbore when a directional change in drilling is desired. The settable slurry can be used in vertical, horizontal, or deviated wellbores.

In general, the components of the settable slurry can be premixed or is injected into the wellbore without mixing, e.g., injected "on the fly" where the components are combined as they are being injected downhole. A pumpable or pourable aqueous settable slurry can be formed by any suitable method. In an exemplary embodiment, the components of the settable slurry is combined using conventional cement mixing equipment or equipment used in fracturing operations. The settable slurry can then be injected, e.g., pumped and placed by various conventional cement pumps and tools to any desired location within the wellbore to fill any desired shape form. In an embodiment, injecting the settable slurry comprises pumping the slurry via a tubular in the wellbore. For example, the slurry can be pumped into an annulus between a tubular and a wall of the wellbore via the tubular. Once the aqueous settable slurry has been placed and assumed the shape form of the desired downhole article, the slurry is allowed to set and form a permanent shape of an article, for example, a plug.

The method is particularly useful for cementing a wellbore, which includes injecting, generally pumping, into the wellbore the settable slurry at a pressure sufficient to displace a drilling fluid, for example a drilling mud, a cement spacer, or the like, optionally with a "lead slurry" or a "tail slurry". The settable slurry can be introduced between a penetrable/rupturable bottom plug and a solid top plug. Once placed, the settable slurry is allowed to harden, and in some embodiments, forms a cement plug in the wellbore annulus, which prevents the flow of reservoir fluids between two or more permeable geologic formations that exist with unequal reservoir pressures.

The amount of calcium carbonate formed from the settable slurry is about 20 g/L to about 200 g/L, about 25 g/L to about 150 g/L, about 30 g/L to about 100 g/L, or about 30 g/L to about 60 g/L, based on gravimetric methods after precipitation. The forms of the precipitated calcium carbonate include amorphous calcium carbonate, calcite, aragonite, or a combination thereof.

The settable slurries are further illustrated by the following non-limiting examples.

EXAMPLES

Figure 2:
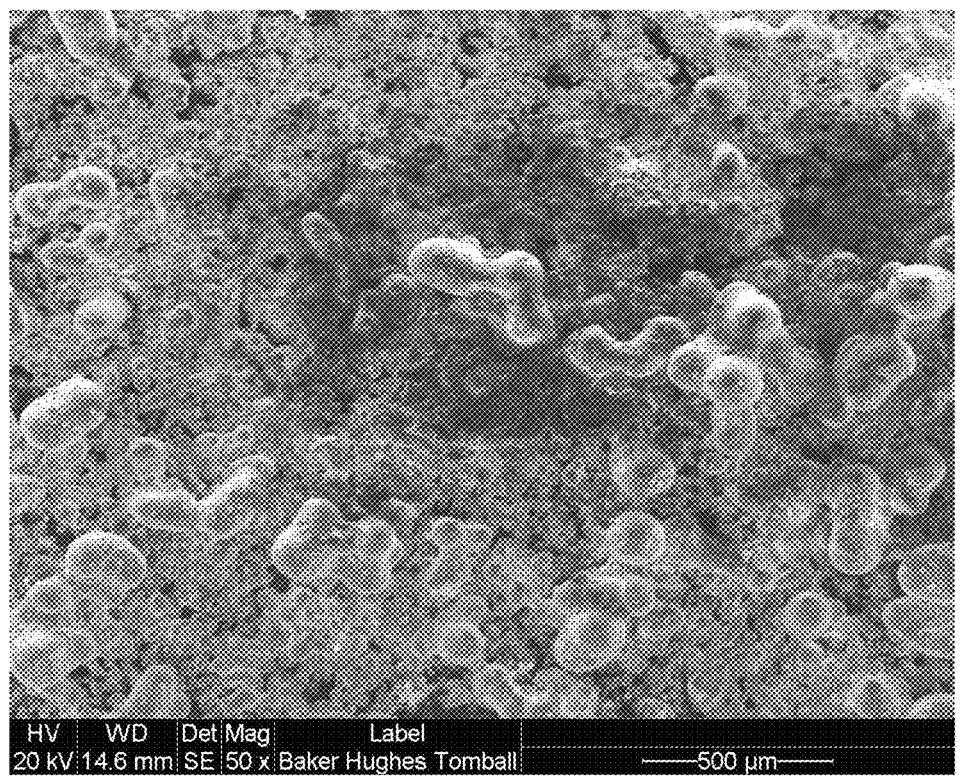
FIG. 2 is a SEM (scanning electron microscope) image of Example C2 after setting at a magnification of 3.×50.
Figure 3:
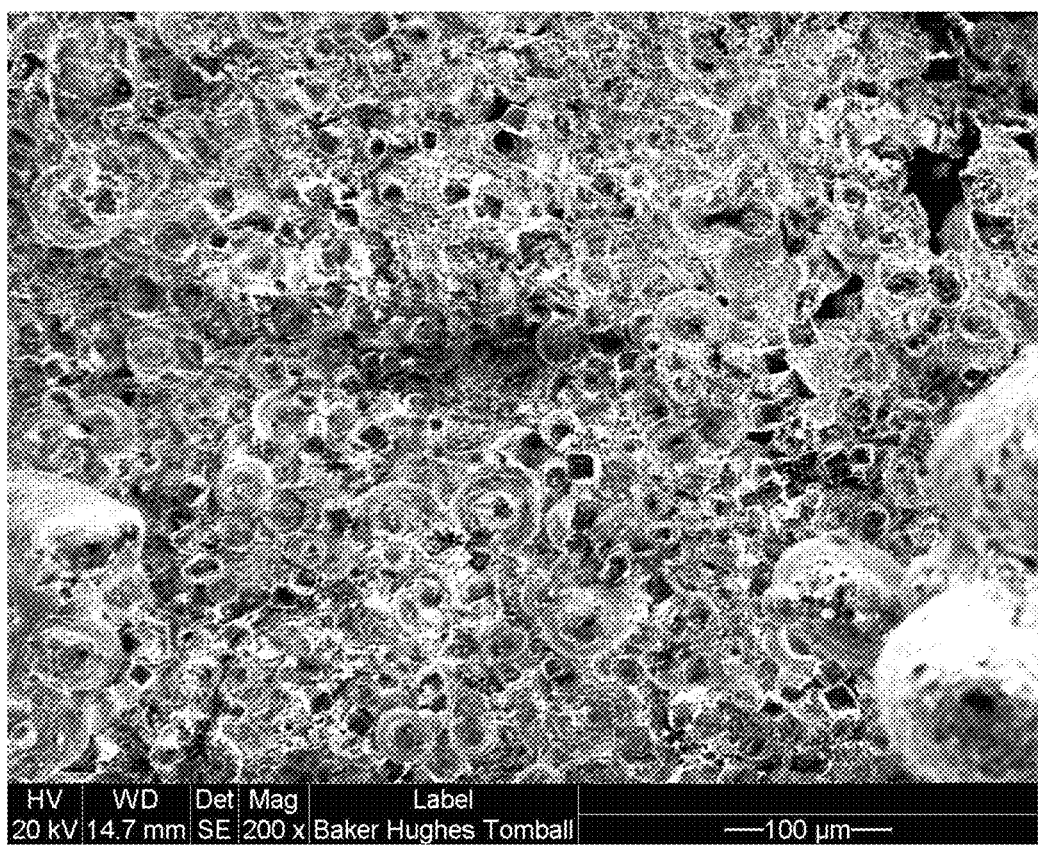
FIG. 3 is a SEM image of Example C2 after setting at a magnification of 5.×200.

Samples were prepared in 50 mL conical tubes by adding buffers A-C as shown in Table 1 to 10 grams of sand so that the final volume in each tube was 40 cc. Enzymes (urease) were added to each tube (Tubes 1 and 2) and then the tubes were capped and mixed well. The tubes were then placed in the 37° C. (100° F.) incubator and allowed to rest overnight and checked every few days. Calcite precipitation was noticed after about 2 days. The results are shown in Table 2 as well as in FIGS. 1-3.

TABLE 1

|  | Buffer A | Buffer B | Buffer C |
|---|---|---|---|
| Urea | 10 mM | 500 mM | 500 mM |
| $CaCl_2$ | 1 mM | 125 mM | 125 mM |
| TRIS* | 0.1 mM | 0.1 mM | 0.1 mM |
| Casein |  |  | 10 g/L |
| pH | 8.0 | 8.0 | 8.0 |

TRIS: 2-amino-2-hydroxmethyl-propane-1,3-diol

TABLE 2

| Buffer | Enzyme (g) | pH (final) | Calcite (g) | Calcite (%) | Calcite Description |
|---|---|---|---|---|---|
| A1 | 0.008 | 9.0 | None |  |  |
| A2 | 400 | 8.6 | None |  |  |
| A3 | 0.027 | 8.9 | None |  |  |
| $A_{Blank}$ |  | 7.0 | None |  |  |

TABLE 2-continued

| Buffer | Enzyme (g) | pH (final) | Calcite (g) | Calcite (%) | Calcite Description |
|---|---|---|---|---|---|
| B1 | 0.008 | 8.9 | 0.77 | 1.9 | Sand, small flakes |
| B2 | 0.410 | 9.1 | 0.63 | 1.6 | Sand, pebbles |
| B3 | 0.028 | 9.1 | None | | |
| $B_{Blank}$ | | 6.9 | None | | |
| C1 | 0.019 | 8.5 | 1.93 | 4.8 | Sand, pebbles, disk structure (large) |
| C2 | 0.413 | 8.5 | 2.88 | 7.2 | Sand, flakes, pebbles, larger chunks |
| C3 | 0.023 | 8.6 | 0.79 | 2.0 | Some sand, flakes, larger chunks |
| $C_{Blank}$ | | 6.3 | None | | |

The casein (milk protein) served to stabilize the urease in solution. It has been shown to enhance the activity of enzymes by about 10 times. In the cases of tests of C2 and B2 a strong ammonia smell was noticed when the test tubes were opened. An increase in pH suggests that the enzymes are breaking down urea into ammonia, which made the solutions basic. C2 had a large assortment of consolidated sand while B2 had some large grains and pebbles but not consolidated to the extent of C2. The results indicate that the enzyme is effective in producing calcite, with the greatest amount of calcite resulting from the larger concentrations of urea and calcium. The addition of casein to the reaction mixture results in increased calcite precipitation.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, it should further be noted that the terms "first," "second," and the like herein do not denote any order, quantity (such that more than one, two, or more than two of an element can be present), or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A method of cementing a wellbore penetrating a subterranean formation, the method comprising:
    injecting into the wellbore a settable slurry comprising: an aqueous carrier; an aggregate; urea; a calcium ion source; and a calcium carbonate producing agent comprising a microbe, an enzyme, or a combination comprising at least one of the foregoing;
    wherein the settable slurry further comprises an enzyme stabilizer, the enzyme stabilizer comprising casein, albumin, powdered milk, whey protein, or bovine serum albumin, or a combination comprising at least one of the foregoing;
    and allowing the settable slurry to set.

2. The method of claim 1 further comprising forming the settable slurry by mixing the aqueous carrier; the aggregate; urea; the calcium ion source; and the calcium carbonate producing agent.

3. The method of claim 1, wherein injecting the settable slurry comprises pumping the settable slurry via a tubular in the wellbore.

4. The method of claim 1, wherein injecting the settable slurry comprises pumping the settable slurry into an annulus between a tubular and a wall of the wellbore via the tubular.

5. The method of claim 1, wherein microbe is from a genus selected from *Bacillus* sp., *Sporosarcina* sp., *Spoloactobacilus* sp., *Clostridium* sp., *Desulfotomaculum* sp., or a combination thereof.

6. The method of claim 1, wherein the microbe comprises *Sporosarcina pasteurii*; *Bacillus megaterium*, *Sporosarcina ureae*; *Pseudomonas aeruginosa*; *Proteus Vulgaris*; *Bacillus sphaericus*; *Myxococcus xanthus*; *Leuconostoc mesenteroides*; *Bacillus subtilis*; *Deleya halophila*; *Halomonas eurihalina*, *Proteus mirabilis*; or *Helicobacter pylori*, or a combination comprising at least one of the foregoing.

7. The method of claim 6, wherein the settable slurry further comprises a nutrient for the microbe.

8. The method of claim 1, wherein the microbe comprises *Sporosarcina pasteurii*.

9. The method of claim 1, wherein the enzyme comprises urease, amidase, carbonic anhydrase, glutamade dehydrogenase, glutamate synthase, or a combination comprising at least one of the foregoing.

10. The method of claim 1, wherein the calcium ion source comprises calcium chloride, calcium bromide, calcium nitrate, or a combination comprising at least one of the foregoing.

11. The method of claim 1, wherein the aggregate comprises sand, gravel, crushed stone, slag, recycled concrete, silica, grass spheres, limestone, feldspar, or a combination comprising at least one of the foregoing.

12. The method of claim 1, wherein the settable composition comprises solids in an amount of about 50 wt. % to about 95 wt. % based on the total weight of the settable slurry.

13. The method of claim 1, wherein the settable composition further comprises an additive which comprises a reinforcing agent, a self-healing additive, a fluid loss control agent, a weighting agent, an extender, a foaming agent, a dispersant, a thixotropic agent, a bridging agent or lost circulation material, a clay stabilizer, or a combination comprising at least one of the foregoing.

14. The method of claim 1, wherein the wellbore is a horizontal, lateral or deviated wellbore.

15. The method of claim 1, wherein the settable slurry remains pumpable at wellbore conditions until setting.

16. The method of claim 1, wherein the calcium ion source is present in an amount effective to provide about 2 mM to about 2.5 M of calcium ions in the settable slurry.

17. The method of claim 1, wherein the calcium ion source is present in an amount effective to provide about 250 mM to about 1.8 M of calcium ions in the settable slurry.

18. A settable slurry for cementing a wellbore penetrating a subterranean formation, the settable slurry comprising:
    an aqueous carrier;
    an aggregate which comprises sand, gravel, crushed stone, slag, recycled concrete, silica, grass spheres, limestone, feldspar, or a combination comprising at least one of the foregoing aggregate;
    urea;
    a calcium ion source;
    a calcium carbonate producing agent comprising a microbe, an enzyme, or a combination comprising at least one of the foregoing;

an enzyme stabilizer, the enzyme stabilizer comprising casein, albumin, powdered milk, whey protein, or bovine serum albumin, or a combination comprising at least one of the foregoing; and solids in an amount of about 50 wt. % to about 95 wt. % based on the total weight of the settable slurry.

19. The settable slurry of claim 18, wherein the microbe is from a genus selected from *Bacillus* sp., *Sporosarcina* sp., *Spoloactobacilus* sp., *Clostridium* sp., *Desulfotomaculum* sp., or a combination thereof.

20. The settable slurry of claim 18, wherein the microbe comprises *Sporosarcina pasteurii; Sporosarcina ureae, Bacillus megaterium, Pseudomonas aeruginosa; Proteus Vulgaris; Bacillus sphaericus; Myxococcus xanthus; Leuconostoc mesenteroides; Bacillus subtilis; Deleya halophila; Halomonas eurihalina, Proteus mirabilis*; or *Helicobacter pylori*, or a combination comprising at least one of the foregoing microbe; and the enzyme comprises urease.

21. The settable slurry of claim 18, wherein the settable slurry has a pH of about 7 to about 10.

22. The settable slurry of claim 18, wherein the urea is present in an amount of about 5 mM to about 2 M based on the total volume of the settable slurry.

23. The settable slurry of claim 18, wherein the aggregate is present in an amount of about 10 wt. % to about 95 wt. % based on the total weight of the settable slurry.

* * * * *